United States Patent [19]

Wessel

[11] 4,078,367
[45] Mar. 14, 1978

[54] SPRING TINE ASSEMBLY FOR FIELD-CROP AGRICULTURAL MACHINES

[75] Inventor: Ulrich Wessel, Gottmadingen, Germany

[73] Assignee: Maschinenfabrik Fahr Aktiengesellschaft Gottmadingen, Gottmadingen, Germany

[21] Appl. No.: 665,948

[22] Filed: Mar. 11, 1976

[30] Foreign Application Priority Data

Mar. 19, 1975 Germany .............................. 2512079

[51] Int. Cl.$^2$ ............................................. A01D 77/08
[52] U.S. Cl. .................................. 56/400; 24/81 CC; 24/262
[58] Field of Search .................. 56/400, 364, 370, 377; 24/81 CC, 262 R

[56] References Cited

U.S. PATENT DOCUMENTS

| 1,934,396 | 11/1933 | Bales | 24/81 CC |
| 2,193,138 | 3/1940 | Meyer | 56/400 |
| 3,715,876 | 2/1973 | McCord | 56/400 X |
| 3,743,762 | 7/1973 | Annas et al. | 24/81 CC X |

FOREIGN PATENT DOCUMENTS

| 803,868 | 4/1951 | Germany | 24/81 CC |
| 729,232 | 5/1955 | United Kingdom | 56/400 |

*Primary Examiner*—Jay N. Eskovitz
*Attorney, Agent, or Firm*—Karl F. Ross

[57] ABSTRACT

A spring tine assembly for agricultural machines has prongs extending from a coil spring in a direction substantially perpendicular to the coil axis. An elastic retainer bridging the prongs or crop-engaging tines forms a passage for each of the prongs and is depressed thereagainst by clamping means, e.g. bolts. The assembly is useful for agricultural machines and, more particularly, for haymaking machines.

5 Claims, 6 Drawing Figures

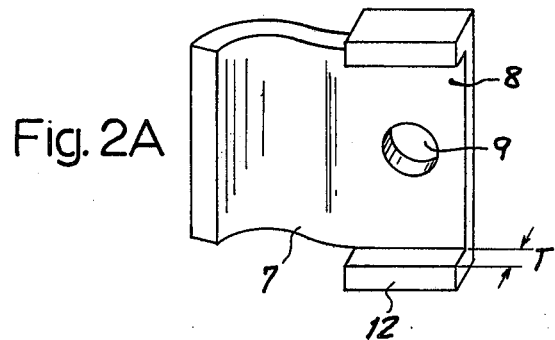
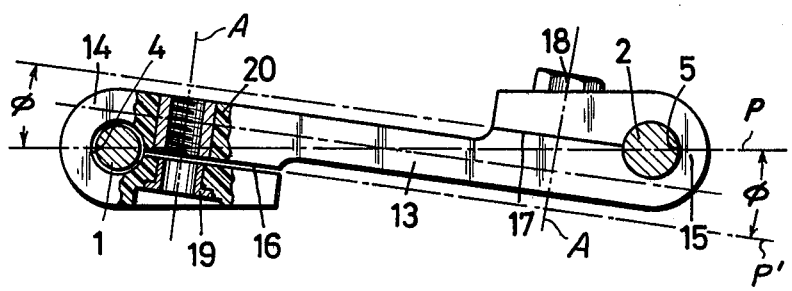
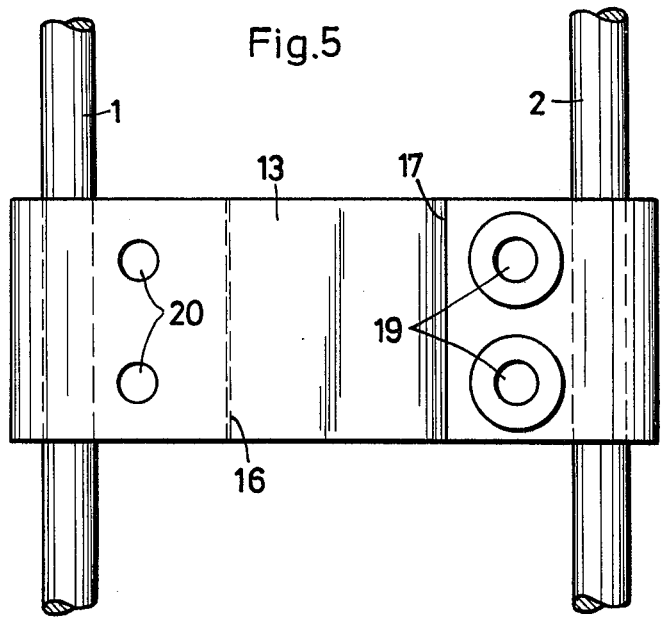

SPRING TINE ASSEMBLY FOR FIELD-CROP AGRICULTURAL MACHINES

FIELD OF THE INVENTION

My present invention relates to a coil spring used in agricultural machines, having at each end a prong extending therefrom substantially perpendicularly to its axis and to a bridging member interconnecting the prongs and holding them in position, even in the event of breakage.

BACKGROUND OF THE INVENTION

Agricultural machines, in particular haymaking machines, are often provided with movable, especially rotatable, rams on which coil springs are located from which springs, prongs or tines extend to engage swaths or layers of cut crop, such as grass, clover and the like, lying on the ground.

The prongs are arranged and moved to spread or scatter and expose to sun the swaths or to collect the crop material. From time to time, the prongs can hit a stone and may be broken off. If a piece of a metal prong detaches from the spring, it is very difficult and even impossible to find it in a crop such as hay. Such a piece of hard metal may then damage other agricultural machines, such as hay or fodder pick-up or baling and chopping implements or can even harmfully wound cattle when swallowed.

Mostly such a rupture of the prong occurs at the region of transition between the coil of the spring and the tine. Thus, a long piece of metal can become intermingled with the crop material. There already have been various attempts to eliminate this danger by preventing broken off portions of the prongs or tines from detaching from the machine. One of these attempts has consisted in attaching to the end of the prong a wire and anchoring the other end of this wire on the arm carrying the coil spring with the prongs. Upon the breaking-off of a piece of one of the prongs, this piece remained attached to a member of the machine and could not be lost.

However, this arrangement proved to have the shortcoming that the broken-off piece in a haymaking machine where the carrying arm is rotated was also swung about and collided with various adjacent parts of the machine and damaged them. The rapid rotation of such a metallic piece and its swinging on a wire could also seriously injure the machine operator, especially on breakage of the wire.

Another proposal for avoiding and setting apart any such danger was in German Utility Model (Gebrauchsmuster) GMB 7 319 115. Here, the individual prongs are clad with a separate and flexibly formed hose (tube) covering the predominant portion of the prong nearly up to the coil winding of the spring. The short pieces of a hose used for this purpose have a diameter smaller than that of the prongs. Due to this difference in the diameter, the hose pieces, after being pulled over the prongs strongly adhere to the latter. The neighboring hose pieces also were interconnected by lashing. The mutual connection of the pair of adjacent prongs maintained the prong spring power important for effective machine operation and prevented an uncontrolled detachment of a broken-off piece of a prong. However, this also had the drawback that the hose pieces were kept on the prongs by squeezing engagement which created difficulties during the mounting of these hose pieces. However, even greater difficulties were those connected with the detachment and separation of such hose pieces from the prongs. These difficulties met both during mounting and dismounting of these hose pieces created significant problems, so that reuse of of such springs and prongs was almost impossible or required an unreasonably long time for the replacement.

OBJECTS OF THE INVENTION

The object of my present invention is, therefore, to provide an improved interconnection between prongs on agricultural machines, especially haymaking machines, which would effectively hold the prongs attached to the coil spring and prevent a broken-off piece of a prong from falling to the ground or from being thrown far from the machine.

Another object of the invention is to provide a spring tine assembly for engagement with crop material in an agricultural implement whereby the aforementioned disadvantages are avoided and wherein the means whereby broken tines are retained on the assembly is removable and replaceable with ease, but yet the broken part is firmly retained to prevent loss and the retainer is capable of reuse and is readily mounted and dismounted.

SUMMARY OF THE INVENTION

These objects are attained with a member bridging the two prongs or tines of a coil spring in an agricultural machine where these prongs or tines are moved to process a swath or layer of a cut crop, such as grass, clover and the like, lying on the ground. The bridging member secures the connection of said prongs with the arm on which the coil spring is located even when a piece of the prong becomes broken off.

The bridging member or retainer is formed from an elastic material and has passages for the prongs. These passages are only slightly greater in diameter than the diameter of the prongs. Clamping members provide compression of the elastic bridging member onto the prongs so that the walls of the passage firmly engage the surfaces of the prongs. Preferably, the clamping members are screws.

The internal diameters of the passages of the elastic bridging member is greater than the diameter of the prongs, so that the elastic bridging member may be easily placed to surround the prongs. After this bridging member has been placed, the clamping means are engaged to firmly press the elastic bridging member against the surfaces of the prongs. It is apparent that after this clamping, a firm connection exists between both prongs. When one of the prongs is broken, the other prong keeps it in position and prevents it from falling into and disappearing in the crop material being manipulated.

It is quite apparent that the mounting of such coils is a very simple operation, as also is their dismounting from the agricultural machine concerned. Thus, new coil springs may be readily substituted for worn or broken ones. The only operations to be done are that of freeing and detaching the clamping means and withdrawing the damaged prong or coil. Then the same bridging member be employed to bind together the prongs of a new coil spring.

Expenditures connected with maintenance, repairs and substitution of these coil springs in the respective agricultural machines are therefore low and/or are within reasonable limits. The utilization of the bridging member of my invention facilitates repairs of all available agricultural machines of the corresponding type and also restructuring of such available machines by installation of the bridging member of my invention.

Both the maintenance of these machines in the above mentioned spirit and/or their reconstruction are connected with important advantages. Falling off of a broken prong is precluded, so that no hard metallic piece remains in the crop and the devices further treating, for instance, hay for preparing cattle fodder (e.g. choppers, blowers or balers) are not exposed to the danger of serious damage.

Thereby, the member providing this advantage is of simple construction and easy to mount and dismount. The bridging member of my invention also is relatively short so that a broken-off prong does not strike the surrounding portions of the agricultural machine.

According to the invention, the bridging member or retainer is an elastic member of rubber or synthetic-resin material (plastic) which is looped around the tines of a spring to form a pair of bights receiving these tines and having a pair of shank members extending from the respective bights to the space between them. One shank of each bight at least is common to a shank of the other bight and may be continuous therewith to form a web spanning the two bights and the clamping means including a pair of bolts each adapted to draw the shanks of the respective bights toward one another adjacent the passage formed by each bight for a respective tine.

When the bridge member is a hose or tube which is pushed over the tines, it may be sufficiently flexible so that the tines deform the hose to provide the respective bights. In this case, both shanks of each bight are connected to the respective shanks of the other bight by the webs of the hose spanning the tines. The hose can be formed on opposite webs with respective holes or apertures which are aligned to receive bolts and pressure plates may be provided between the head of the bolt and one web and the nut of the bolt and the other web to prevent tearing of the hose. Advantageously, the pressure plates have abutments which flank the edges of the respective web and engage the abutments of the opposing pressure plate. The frictional force with which the tines are received can be further increased by providing each of the pressure plates with an arm which reaches around the bight and bears thereagainst to hold the bight portion of the hose against the tine.

Alternatively, the bight can be formed for each tine by a passage molded into an end of a synthetic-resin strap which is slitted so that a slot extends into the passage. The shanks of the bights can then be drawn together by bolts threaded into one shank and passing through the other. To this end, the one shank can be provided with an internally threaded bushing adapted to receive the bolt.

BRIEF DESCRIPTION OF THE DRAWING

The above and other features of my invention will now be described in detail with reference to the accompanying drawing in which:

FIG. 2A is a perspective view of a clamping plate used in the embodiment illustrated by FIG. 1;

FIG. 4 is a sectional view, partly broken away, of another embodiment of the present invention; and FIG. 5 is a side view of the embodiment of my invention illustrated by FIG. 4.

SPECIFIC DESCRIPTION

The invention deals with a bridging member connecting two prongs of a coil spring utilized in an agricultural machine for gathering, picking-up, spreading or turning cut crops lying on the ground. Such machines are, for instance, pick-up devices for hay balers, field harvesters and choppers, rakes forming swaths, hay-tedding machines and the like (see U.S. Pat. No. 3,640,056 and the references therein cited). In these machines, the bridging member of my invention prevents the prongs from separating from the machine. In one of the embodiments, said bridging member is in the form of an endless looped hose placed about both the prongs and compressed thereagainst by a pair of opposite clamps connected by screw bolts and nuts. The second embodiment of the retainer or bridging member is a molded elastic strap having a passage for a prong at each end thereof. The strap has terminal portions overlapping bent inwardly onto the strap in the areas of the passages. These overlapping portions narrow the passages and strongly grip the prongs on being tightly clamped on said strap. Screws or bolts ensure such a tight clamping.

Figure 1:
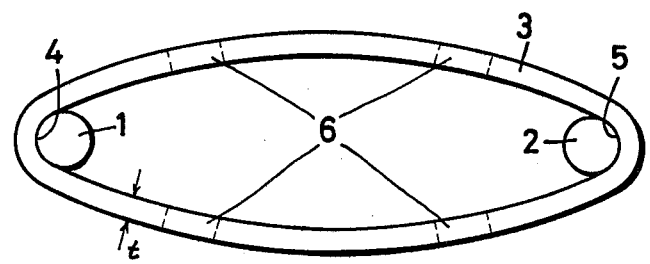
FIG. 1 is a bottom view of one embodiment of my invention, the bridging member being shown in its condition before it is clamped to the prongs.

FIG. 1 shows the prongs 1 and 2 of a coil spring extending laterally therefrom. Around these prongs, a closed looped hose 3 is positioned, such as, for instance, a section of rubber hose. In its nondeformed condition, this hose 3 may have a circular cross-section. There also can be utilized a hose of elliptical configuration. Here, the larger diameter, i.e. the longest axis of the formation of the rubber hose, in any case must exceed the distance between the two prongs 1 and 2. This ensures that the endless hose may be readily positioned to surround the prongs 1 and 2, though this diameter of the hose 3 should not be much greater than the spacing between the prongs 1 and 2. This dimensioning of the endless hose 3 ensures that the same has a certain hold on the prongs 1 and 2 during the mounting operation.

After the endless hose 3 has been located to encircle the prongs 1 and 2, the latter are received in passages formed by the curved sections 4 and 5 of the hose. The diameter of these sections 4 and 5, before any clamping means have been applied, is greater than that of the prongs 1 and 2. FIG. 1 displays the compliance with this condition by having each point of the contacting surface of the prongs opposed by a point on the interior adjacent surface of the endless hose 3. It is apparent that endless hose 3 may be put around the prongs 1 and 2 without any difficulty.

The endless hose is shown to have in opposite sections thereof adjacent the prongs pairs of apertures 6. These apertures 6 are arranged so that, on compression of the hose 3, two opposite apertures are aligned with one another.

Figure 2:
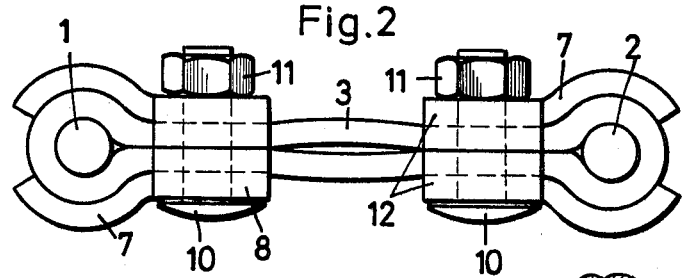
FIG. 2 is a corresponding view after the bridging member has been clamped to grip the prongs.

FIG. 2 shows the bridging member, i.e. the endless looped hose 3, in its position after it has been clamped onto the prongs 1 and 2. The depression of the hose 3 onto each of the prongs is provided by a pair of opposite and adjacent rigid clamping arms 7 of metal or plastic. These clamping arms 7 are bent (FIG. 2A) so that they substantially follow the curvature of the bight of the hose and have an arched terminal substantially conformed to the hose bight in the area where it bends around the prong.

Figure 3:
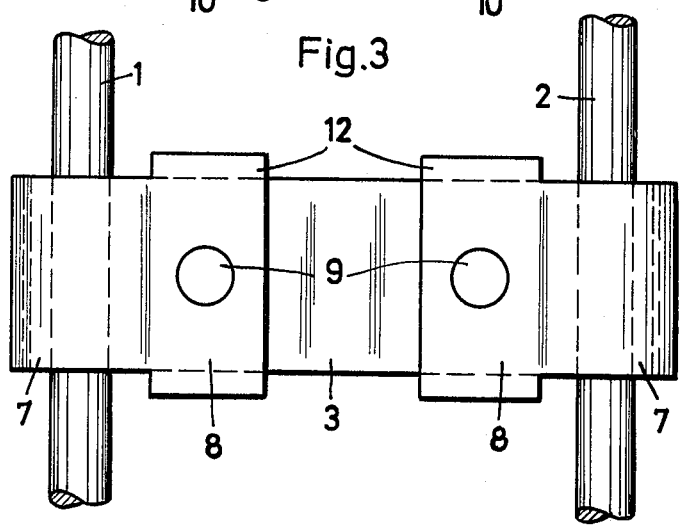
FIG. 3 is a side view of the embodiment shown in FIGS. 1 and 2.

The clamping compression is achieved by means of U-section plates 8 integral with the arms 7, wherethrough bores 9 are provided. Through these bores 9 and through the apertures 6 of the endless hose 3, a clamping bolt 10 is passed. This bolt 10 is threaded into a nut 11 that may be tightened to provide a compression onto the endless hose 3 and the prongs 1 and 2. The plates 8 have abutments 12 flanking the edges of the hose and of a thickness T approximately equal to the thickness $t$ of the hose and by which the plates in each pair contact one another so that the approach of the opposing plates is limited and any excess compression of the endless hose 3 is avoided. Any excess compression of the hose 3 could result in tearing. The abutments 12 on the plates 8 are visible in FIGS. 2 and 3 and their form is displayed in FIG. 2A.

The tightening of the nuts 11 causes the endless hose 3 to strongly grip the prongs 1 and 2. The adherence of the bridging hose does not prevent nor hamper the mobility and springing capacity of the prongs 1 and 2. The prongs are tied to one another by the endless hose 3 serving to provide the bridging, so that a broken-off prong is strongly bound to the other prong and does not detach itself from the machine. It also could happen that by a strong collision with the soil or a stone both the prongs are ruptured and fall off. If this occurs, the situation is totally different from what it was when a single prong was apt to be mingled into the crop such as, for instance, grass or hay. The pair of prongs tied to one another by bridging hose 3 is bulkier than a single prong and may be easily found in the grass or hay. The visibility of this detached piece may be improved by providing the endless hose 3 with a signalling color.

When rupture of the prongs occurs, the bridging endless hose may be easily separated from the no-longer utilizable prongs by a simple unscrewing of the nuts and may be then employed for another pair of intact prongs of an agricultural machine of the corresponding type.

FIG. 4 shows an elastic molded body or strap 13 connecting the prongs. The material wherefrom this body is made must be such that the body has a full stability of form. Also here, passages 4 and 5 are provided for prongs 1 and 2 and these passages have diameters only slightly greater than that of the prongs 1 and 2.

The strap 13 forming the mentioned bridging member has a central section ending at either side by a U-shaped terminal 14 or 15 in which bight a section overlaps the central section of the strap. In the bottom of the curvature providing the U-shape of the terminal, on either side of the central section, a transverse passage 16 or 17 for a prong is provided. The diameter of the passages 16 and 17 is selected so that they are apt to firmly fix and keep the prongs 1 and 2.

For approaching the wings of the U-form terminals 14 and 15 to the central section of the bridging strap 13, clamping screw bolts 18 are provided, as FIG. 4 shows. The bolts 18 pass through bores provided in the terminals and the central portion of the bridging strap 13, the axis of said bores being aligned with one another, so that said bolt 8 may be led therethrough.

In order to increase the strength and solidity and the lifetime of the bridging strap 13, either in the central section, or in the terminal, within the bore passing therethrough, a metallic bushing 20 is located wherethrough another metallic threaded bushing is positioned. The screw bolt 18 is provided with outer threading on which it engages the threads of the bushing 20 so that the e.g. clockwise rotation of the screw bolt 18 depresses the terminal 14 and 15 onto the central section of the bridging strap 13 and this tightens the passages 4 and 5.

FIGS. 4 and 5 show that the clamping screw is arranged adjacent the prongs 1 and 2. It is apparent that the configuration of the wings of the terminals 14 and 15 and diameter of the gaps 16 and 17 determine the space available for clamping the prongs.

It is also apparent that there exists between the internal surface of the wings of the terminals 14 and 15 and the opposite surface of the central section of the bridging strap 13 the gaps 16 and 17 and that the same may be narrowed by tightening of the screw bolts 18. These gaps 16 and 17 lie in planes including an acute angle from a plane passing through the longitudinal axes of the prongs 1 and 2, the angle not exceeding 20°. FIG. 4 shows by dot-dashed lines a plane P passing through the axes of the prongs 1 and 2 and a plane P' passing through the gaps 16 and 17 between the overlapping wings of the U-shaped terminals 14 and 15. Between these planes P and P', the angle $\phi$ is shown indicating the inclination of the gaps 16 and 17 in regard to the plane in which the prongs 1 and 2 extend. The bolts 18 lie along axis A which are perpendicular to the plane P'.

FIG. 5 illustrates a top view of the bridging band 13 displayed by FIG. 4, but the nuts and screw bolts are not shown. It is apparent that the prongs 1 and 2 may be introduced into the passages 4 and 5 either by pushing them through these passages or by pushing them inwardly from the internal side through the gaps 16 and 17.

I claim:

1. A spring assembly for an agricultural machine, especially a rotary haymaking machine, comprising in combination:

a coil spring having a pair of prongs projecting therefrom in a direction substantially perpendicular to the spring axis, said prongs being spaced apart and generally parallel with one another;

a continuous elastic retainer of a plastic material formed in a single piece bridging the prongs and forming passages receiving the prongs, the retainer being a looped hose having the major axis of its cross section longer than the spacing between said prongs and having bights surrounding said prongs; and clamping means between said prongs for pressing the walls of said passages against said prongs for frictionally retaining said prongs against release from said assembly, said clamping means including a pair of opposite rigid clamps having arched arms and plates integral with said arms, said arms and plates partially embracing from either side the bights of said hose, and bolts drawing the opposite plates toward each other.

2. The spring assembly defined in claim 1 wherein said looped hose has mutually opposite apertures therethrough, said plates being provided with holes registered with said apertures, said bolts passing through said holes and said apertures so that screwing of said bolts compresses said hose onto said prongs and screws them in position.

3. A spring assembly for an agricultural machine, especially a rotary haymaking machine, comprising in combination:

a coil spring having a pair of prongs projecting therefrom in a direction substantially perpendicular to the spring axis, said prongs being spaced apart and generally parallel with one another;

a continuous elastic retainer of rubber formed in a single piece bridging the prongs and forming passages receiving the prongs, the retainer being a looped hose having the major axis of its cross section longer than the spacing between said prongs and having bights surrounding said prongs; and clamping means between said prongs for pressing the walls of said passages against said prongs for frictionally retaining said prong against release from said assembly, said clamping means including a pair of opposite rigid clamps having arched arms and plates integral with said arms, said arms and plates partially embracing from either side the bights of said hose, and bolts drawing the opposite plates toward each other.

4. The spring assembly defined in claim 3 wherein said looped hose has mutually opposite apertures therethrough, said plates being provided with holes registered with said apertures, said bolts passing through said holes and said apertures so that screwing of said bolts compresses said hose onto said prongs and screws them in position.

5. A spring assembly for an agricultural machine, especially a rotary haymaking machine, comprising in combination:

a coil spring having a pair of prongs projecting therefrom in a direction substantially perpendicular to the spring axis, said prongs being spaced apart and generally parallel with one another;

a continuous, elastic, plastic strap in the form of a single-piece, looped hose having the major axis of its cross-section longer than the spacing between said prongs, while bridging said prongs and having portions bent around said prongs to form respective bights defining passages receiving the respective prongs; and clamping means between said prongs for pressing the walls of said passages against said prongs for frictionally retaining said prongs against release from the assembly, said clamping means including a pair of opposite rigid clamps having arched arms and plates integral with said arms, said arms and plates partially embracing from either side the bights of said strap, and bolts drawing the opposite plates toward each other.

* * * * *